United States Patent
Ertas

(10) Patent No.: US 11,473,448 B2
(45) Date of Patent: Oct. 18, 2022

(54) EXTERNALLY PRESSURIZED FLUID-FILM BEARING SYSTEM INCLUDING HERMETIC FLUID DAMPER WITH PASS-THROUGH CHANNELS

(71) Applicant: General Electric Company, Schenectady, NY (US)

(72) Inventor: Bugra Han Ertas, Niskayuna, NY (US)

(73) Assignee: GENERAL ELECTRIC COMPANY, Schenectady, NY (US)

( * ) Notice: Subject to any disclaimer, the term of this patent is extended or adjusted under 35 U.S.C. 154(b) by 773 days.

(21) Appl. No.: 16/504,242

(22) Filed: Jul. 6, 2019

(65) Prior Publication Data

US 2021/0003034 A1  Jan. 7, 2021

(51) Int. Cl.
| | |
|---|---|
| F01D 25/22 | (2006.01) |
| F16F 13/00 | (2006.01) |
| F02C 7/06 | (2006.01) |
| F16F 15/023 | (2006.01) |
| F16F 15/02 | (2006.01) |

(52) U.S. Cl.
CPC ............ *F01D 25/22* (2013.01); *F02C 7/06* (2013.01); *F16F 13/00* (2013.01); *F16F 15/022* (2013.01); *F16F 15/0237* (2013.01)

(58) Field of Classification Search
CPC .......... F01D 25/22; F01D 25/164; F02C 7/06; F16F 13/00; F16F 15/022; F16F 15/0237
See application file for complete search history.

(56) References Cited

U.S. PATENT DOCUMENTS

| | | | |
|---|---|---|---|
| 4,638,895 | A | 1/1987 | Taylor et al. |
| 4,768,627 | A | 9/1988 | Taylor |
| 5,487,454 | A | 1/1996 | Klembczyk et al. |
| 6,216,831 | B1 | 4/2001 | Taylor |

(Continued)

OTHER PUBLICATIONS

E. J. Gunter et al., "Stabilization of Turbomachinery with Squeeze Film Dampers—Theory and Applications", pp. 01-10, Jun. 18, 1976.

(Continued)

*Primary Examiner* — Jacob M Amick
*Assistant Examiner* — Charles J Brauch
(74) *Attorney, Agent, or Firm* — Venable LLP; Elizabeth C. G. Gitlin; Michele V. Frank

(57) ABSTRACT

A bearing system including a frequency independent damper assembly and a bearing pad assembly. The damper assembly includes a housing, a plunger, a moving central post and a support spring. The plunger is movable within a housing to define a first primary damper cavity and a second primary damper cavity. The moving central post has defined therein a fluid channel for a pressurized working fluid flow. The support spring includes a plurality of flexible elements coupled to the housing and disposed radially outward of the first and second primary damper cavities. The support spring defines first and second accumulator cavity. A flow-through channel couples the first accumulator cavity to the second accumulator cavity. In an embodiment, the flow-through channel may be disposed within the moving central post. The bearing pad assembly includes a bearing pad including a plurality of bearing pad orifices coupled to the fluid channel in the moving central post.

20 Claims, 8 Drawing Sheets

(56) References Cited

U.S. PATENT DOCUMENTS

| | | | |
|---|---|---|---|
| 6,345,707 | B1 | 2/2002 | Klembczyk |
| 7,374,342 | B2 | 5/2008 | Yum et al. |
| 7,492,069 | B2 | 2/2009 | Knox et al. |
| 7,625,121 | B2 | 12/2009 | Pettinato et al. |
| 9,121,448 | B2 | 9/2015 | Marquf7 et al. |
| 9,416,820 | B2 * | 8/2016 | Ertas ............... F01D 9/041 |
| 9,429,191 | B2 | 8/2016 | Ertas et al. |
| 9,746,029 | B1 | 8/2017 | Mook et al. |
| 10,001,166 | B2 | 9/2018 | Ertas et al. |
| 10,066,505 | B2 | 9/2018 | Ertas et al. |
| 2019/0032477 | A1 | 1/2019 | Huang |

OTHER PUBLICATIONS

Jianming Cao et al., "Nonlinear Modeling of Tilting-pad Bearings with Squeeze Film Dampers and Application to Flexible Rotor Analysis", Journal of Engineering Research and Application, vol. 07, Issue: 10, pp. 51-68, Oct. 2017.

Bugra Ertas et al., "Hermetically Sealed Squeeze Film Damper for Operation in Oil-free Environments", Journal of Engineering for Gas Turbines and Power, vol. 141, Issue: 2, pp. 01-09, Oct. 15, 2018.

\* cited by examiner

EXTERNALLY PRESSURIZED FLUID-FILM BEARING SYSTEM INCLUDING HERMETIC FLUID DAMPER WITH PASS-THROUGH CHANNELS

BACKGROUND

The field of the disclosure relates generally to gas bearing systems, and more particularly, to externally pressurized fluid-film gas bearing system including a frequency independent damper assembly and bearing pad.

Conventional turbomachines possess rotor assemblies that include shafts, compressor impellers, turbines, couplings, sealing packs and other elements required for optimal operation under given operating conditions. These rotor assemblies have a mass generating a constant static force due to gravity, and also generate a dynamic force due to imbalances in the rotor assembly during operation. Other static forces can be generated from geared turbomachinery. Such turbomachines include bearings to sustain and support these forces while permitting rotation of the rotor assembly.

With the use of fluid-film bearings that leverage the process working fluid of the machine for lubrication (oil-free turbomachinery), one can simplify mechanical design over those requiring oil lubrication and enable the removal of all support systems indicative of these lubrication systems. Also, with the removal of oil, gas bearings can operate at high temperatures, which can enable application with extreme temperature environments. With this in mind, a bearing using a gas (i.e. air/$CO_2$) for a fluid film was conceived.

At least some known rotary machines use gas bearings where a non-oil lubricated bearing is desired. A typical non-oil lubricated bearing, and more specifically, a gas bearing includes a bearing support including hermetic squeeze film dampers (HSFD). More specifically, the HSFDs are intended to work in an air bearing system damping vibrations and enabling stable operation of the rotor system at high speeds.

A typical additively built gas bearing system 100 with a HSFD is illustrated in FIG. 1 and referenced prior art. The system 100 in general includes a bearing pad 102 connected to a bearing housing 104, having housed therein an HSFD. A pad central pad or post 114 creates an annular clearance 110 with a hair-pin support structure. On the top and bottom of the annular clearance 110 there are two opposing fluidic volumes, or damper cavities, 108, bounded and defined by annular flexible elements 106, that behave in a reciprocating manner when vibration is imposed on the associated bearing pad 102. The mechanism of damping that is generated in the bearing support is generated from pressure driven Poiselle flow, which is a function of volumetric displacement of the opposing fluidic volumes and vibratory velocity.

The annular flexible elements 106 act as the support springs of the bearing pad 102 and define the static stiffness coefficient of the bearing system 100. The annular flexible elements 106 along with the bearing pad 102 and the housing 104 create the two opposing fluid control volumes 108 that are connected by the single restrictive annular clearance 110. Air/pressurized working fluid 112 is directed through the central pad or post 114, which provides a fluid film lubricant 116 via a plurality of bearing pad orifices 122 between a rotor 118 and a bearing surface 120. It is noted that the prior art embodiment of FIG. 1 includes only two fluid cavities 108 and one critical restrictive annular clearance 110.

The inventor has observed that these types of known bearing systems, that have been adapted for use in full-scale turbomachinery, include HSFDs that typically are frequency dependent and do not work as desired. As stated, the two flexible elements 106 of the gas bearing system 100, make up the bearing support spring (stiffness, K). These two flexible elements 106 "bound" the primary damper cavity 108 fluid volumes where high dynamic pressures are generated. Dynamic pressures due to the "pushing" of the damper fluid during vibration not only provide viscous dissipation at the damper annular clearance 110 but also deform the flexible elements 106. The deformation of the flexible elements 106 due to pressure, creates unwanted and undesirable volume changes in the primary damper cavity 108.

In these known bearing systems, the bearing support has a very strong frequency dependency both for stiffness and damping. Not only does the stiffness increase in the bearing support as vibratory frequency is increased, but the damping coefficient decreases with increasing frequency of vibration. This is not desirable because increasing the stiffness coefficient in the bearing support will reduce the equivalent damping of the bearing system (takes into account gas film+bearing support). In other words, if the stiffness in the bearing support is large then the majority of the vibratory motion and energy dissipation resides in the gas film, where the damping is very poor.

Therefore, the inventors have provided an improved gas bearing system including a novel frequency independent HSFD damper assembly and a bearing pad assembly.

BRIEF DESCRIPTION

Aspects and advantages of the disclosure are set forth below in the following description, or may be obvious from the description, or may be learned through practice of the disclosure.

In one aspect, a gas bearing system is provided. The gas bearing system includes a frequency independent damper assembly and a bearing pad assembly in fluid communication with the frequency independent damper assembly. The frequency independent damper assembly including an annular damper housing, a damper plunger disposed at least partially within the annular damper housing. The damper plunger is movable within the annular damper housing to define a first primary damper cavity and a second primary damper cavity. The frequency independent damper assembly further including a moving central post having defined therein a fluid channel for the flow of a pressurized working fluid, a support spring including a plurality of flexible elements coupled to the annular damper housing and defining a plurality of accumulator volumes, wherein the plurality of accumulator volumes comprise a first accumulator cavity and a second accumulator cavity, and at least one flow-through channel coupling the first accumulator cavity to the second accumulator cavity. An externally imposed vibration transmitted from the moving central post to the damper plunger modulates the first primary damper cavity and the second primary damper cavity. The plurality of flexible elements are disposed radially outward of the first primary damper cavity and the second primary damper cavity. The bearing pad assembly includes a bearing pad having a plurality of bearing pad orifices fluidly coupled to the fluid channel in the moving central post.

In another aspect, a gas bearing system is provided. The gas bearing system including an outer rim, a housing, a frequency independent damper assembly disposed in the housing and a bearing pad assembly in fluid communication with the frequency independent damper assembly. The frequency independent damper assembly including a damper housing, a damper plunger disposed at least partially within the damper housing, a moving central post having defined therein a fluid channel for the flow of a pressurized working fluid, a support spring including a plurality of flexible elements coupled to the damper housing and defining a plurality of accumulator volumes, wherein the plurality of accumulator volumes comprise a first accumulator cavity and a second accumulator cavity, and a plurality of non-restrictive flow-through channels coupling the first accumulator cavity to the second accumulator cavity. The damper plunger is movable within the damper housing to define a first primary damper cavity and a second primary damper cavity. An externally imposed vibration transmitted from the moving central post to the damper plunger modulates the first primary damper cavity and the second primary damper cavity. The flexible elements are disposed radially outward of the first primary damper cavity and a second primary damper cavity. The bearing pad assembly including a bearing pad including a plurality of bearing pad orifices coupled to the fluid channel in the moving central post.

In yet another aspect, a gas bearing system is provided. The gas bearing system includes an outer rim, a housing, a frequency independent damper assembly disposed in the housing and a bearing pad assembly in fluid communication with the frequency independent damper assembly. The frequency independent damper assembly including a damper housing, a damper plunger disposed at least partially within the housing. The damper plunger is movable within the housing to define a first primary damper cavity and a second primary damper cavity. The frequency independent damper assembly further including a moving central post having defined therein a fluid channel for the flow of a pressurized working fluid and a support spring including a plurality of flexible elements coupled to the damper housing and defining a plurality of accumulator volumes. The flexible elements are disposed radially outward of the first primary damper cavity and a second primary damper cavity. The plurality of accumulator volumes comprise a first accumulator cavity and a second accumulator cavity. The damper assembly further including at least one non-restrictive flow-through channel coupling the first accumulator cavity to the second accumulator cavity and a plurality of restrictive clearances fluidically decoupling the first accumulator cavity and the second accumulator cavity from the first primary damper cavity and the second primary damper cavity. The first primary damper cavity and the second primary damper cavity are in fluid communication via a primary damper cavity clearance. An externally imposed vibration transmitted from the moving central post to the damper plunger modulates the first primary damper cavity and the second primary damper cavity. The bearing pad assembly including a bearing pad coupled to the damper housing and a plurality of bearing pad orifices coupled to the fluid channel in the moving central post.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present disclosure, including the best mode thereof to one skilled in the art, is set forth more particularly in the remainder of the specification, including reference to the accompanying figures, in which.

Figure 1:
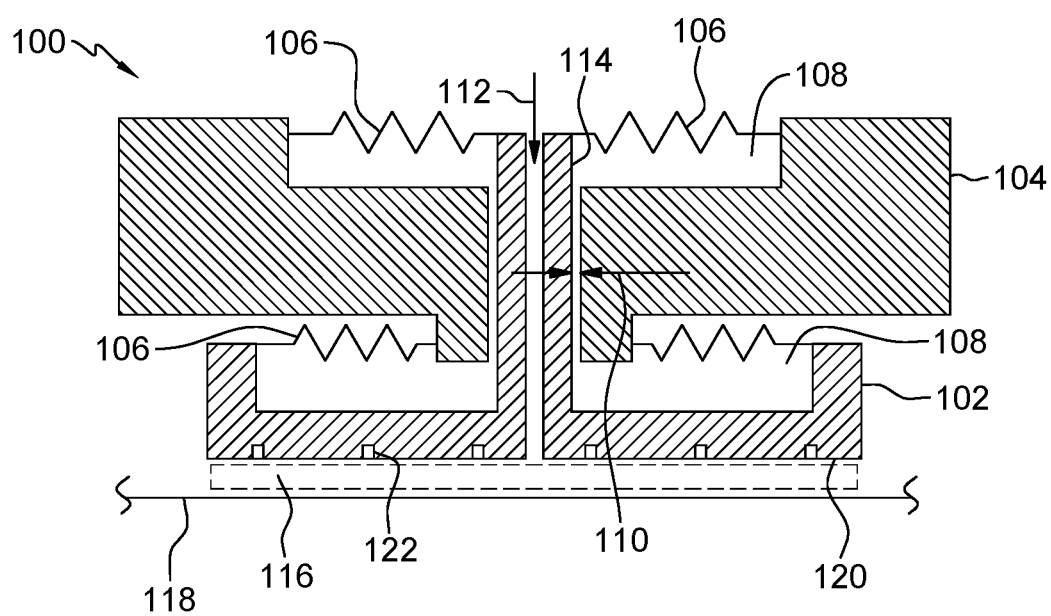
FIG. 1 is a schematic cross-section of a known gas bearing system, including a frequency dependent HSFD assembly and a bearing pad assembly, indicated as prior art.

Unless otherwise indicated, the drawings provided herein are meant to illustrate features of embodiments of the disclosure. These features are believed to be applicable in a wide variety of systems comprising one or more embodiments of the disclosure. As such, the drawings are not meant to include all conventional features known by those of ordinary skill in the art to be required for the practice of the embodiments disclosed herein. Corresponding reference characters indicate corresponding parts throughout the several views of the drawings.

DETAILED DESCRIPTION OF THE DISCLOSURE

One or more specific embodiments of the present disclosure will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present invention, the articles "a," "an," "the," and "said" are intended to mean that there are one or more of the elements. The terms "comprising," "including," and "having" are intended to be inclusive and mean that there may be additional elements other than the listed elements.

Embodiments of the present disclosure provide for a gas bearing system including frequency independent HSFD assemblies, also referred to herein as bearing supports, as compared to conventional frequency dependent gas bearings, and bearing pad. In at least some embodiments, the inventive bearing system provides a high-performance fluid damper with a hydrostatically pressurized compliant bearing pad. Moreover, the frequency independent damper assemblies include a hermetic squeeze film damper that not only possesses a first, or upper, primary damper cavity and second, or lower, primary damper cavity, but also includes accumulator volumes, including a pass-through channel and the flexible elements of the system.

Each example is provided by way of explanation of the disclosure, not limitation of the disclosure. In fact, it will be apparent to those skilled in the art that modifications and variations can be made in the present disclosure without departing from the scope or spirit thereof. For instance, features illustrated or described as part of one embodiment may be used on another embodiment to yield a still further embodiment. Thus, it is intended that the present disclosure covers such modifications and variations as come within the scope of the appended claims and their equivalents.

The inventors have observed that damper assemblies in conventional gas bearing systems are typically frequency dependent. More particularly, in a gas bearing system there are included two mechanical elements in series: (i) a gas film represented by a stiffness (K) and damping (C) coefficient; and (ii) in series with the gas film, there is the bearing support, also referred to herein as the damper or damper assembly. The damper is comprised of a fluidic damper and a support spring (flexible elements). The bearing support spring and the damper have their own stiffness (K) and damping (C) coefficients. Under ideal engineering conditions or ideal bearing support design, the bearing support spring and the damper would not be frequency dependent, and more particularly the stiffness coefficient (K) would only be static and the damping (C) coefficient would not change with frequency.

Accordingly, disclosed is a gas bearing system including HSFD architecture and bearing pad assembly that uses several design concepts in combination to yield a novel damper and bearing pad design including a gas/fluid delivery system, and thus novel gas bearing system. On a high level, the concept uses a series of fluidic cavities connected through carefully controlled restrictive clearances, where the cavity volumes are modulated through externally imposed vibratory motion and a pressurized gas/fluid delivery port in a central pad post for the delivery of the pressurized gas/fluid to the bearing pad. The external imposed vibratory motion creates a recirculating fluid flow through the cavities and restrictions to generate robust levels of viscous damping. The novel design renders the stiffness and damping coefficients to be frequency independent. To provide such, the design locates flexible elements outside of the high-pressure zones of the primary damper cavities and moves the flexible elements to accumulator cavities connected by a non-restrictive pass-through channel. The integration of the pressured gas delivery port/passages with the pass-through channels in the same central pad post or about an outer diameter of the damper assembly results in a unique configuration.

Figure 2:
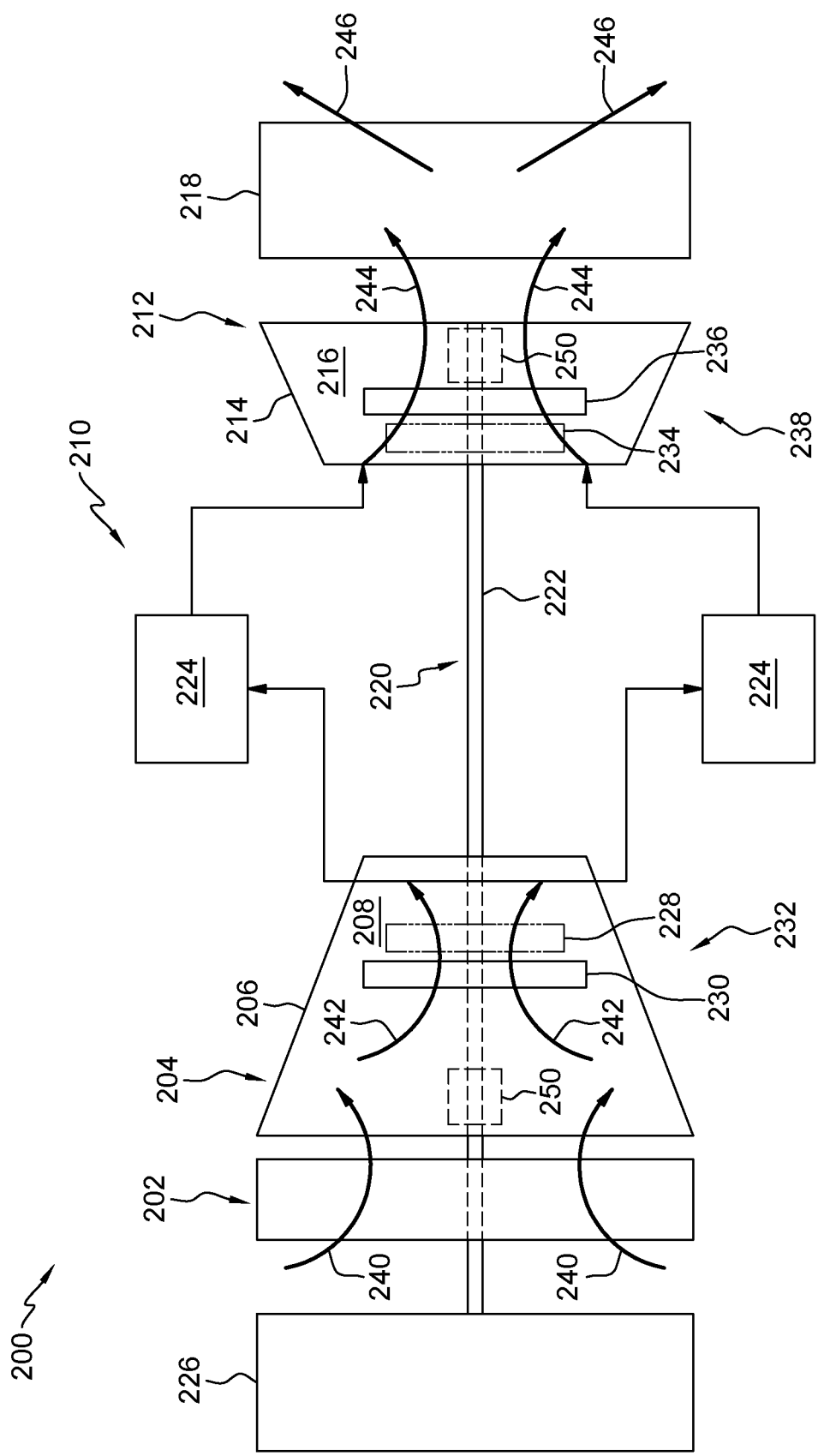
FIG. 2 is a schematic view of a rotary machine, in accordance with one or more embodiments of the present disclosure.

Referring now to FIG. 2, illustrated is a schematic view of a rotary machine, i.e., a turbomachine 200, and more specifically, a non-oil lubricated turbine engine. In the exemplary embodiment, the turbine engine is a gas turbine engine. Alternatively, the turbomachine 200 is any other turbine engine and/or turbomachine, including, without limitation, a steam turbine engine, a centrifugal compressor, and a turbocharger. In the exemplary embodiment, the turbomachine 200 includes an air intake section 202, and a compressor section 204 that is coupled downstream from, and in flow communication with, the intake section 202. The compressor section 204 is enclosed within a compressor casing 206 defining a compressor chamber 208. A combustor section 210 is coupled downstream from, and in flow communication with, the compressor section 204, and a turbine section 212 is coupled downstream from, and in flow communication with, the combustor section 210. The turbine section 212 is enclosed within a turbine casing 214 defining a turbine chamber 216. An exhaust section 218 is provided downstream from the turbine section 212. Moreover, in the exemplary embodiment, the turbine section 212 is coupled to the compressor section 204 via a rotor assembly 220 including a drive shaft 222. The drive shaft 222 is rotationally supported by one or more bearing systems 250, for example, gas bearing or journal bearing systems (shown at multiple positions in accordance with one or more embodiments at 260) located within the compressor casing 206 and the turbine casing 214.

In the exemplary embodiment, the combustor section 210 includes a plurality of combustor assemblies, i.e., the combustors 224 that are each coupled in flow communication with the compressor section 204. Moreover, in the exemplary embodiment, the turbine section 212 and the compressor section 204 are rotatably coupled to a load 226 via the drive shaft 222. For example, the load 226 may include, without limitation, an electrical generator and/or a mechanical drive application, e.g., a pump, a propeller, fan, rotor, or the like. In some embodiments, the turbomachine 200 may be an aircraft engine.

Also, in the exemplary embodiment, the compressor section 204 includes at least one compressor blade assembly 228 and at least one optional adjacent stationary vane assembly 230. Each combination of the compressor blade assembly 228 and adjacent stationary vane assembly defines a compressor stage 232. Also, each compressor blade assembly 228 includes a plurality of compressor blades (not shown in FIG. 1) and each stationary vane assembly 230 includes a plurality of compressor vanes (not shown in FIG. 1). Furthermore, each compressor blade assembly 228 is removably coupled to the drive shaft 222 and each stationary vane assembly 230 is removably coupled to, and supported by, the compressor casing 206.

Further, in the exemplary embodiment, the turbine section 212 includes at least one turbine blade assembly 234 and at least one adjacent stationary nozzle assembly 236. Each combination of turbine blade assembly 234 and adjacent stationary nozzle assembly 236 defines a turbine stage 238. Also, each turbine blade assembly 234 is removably coupled to the drive shaft 222 and each stationary nozzle assembly 236 is removably coupled to, and supported by, the turbine casing 214.

In operation, the air intake section 202 channels air 240 towards the compressor section 204. The compressor section 204 compresses the inlet air 240 to higher pressures and temperatures prior to discharging a compressed air 242 towards the combustor section 210. The compressed air 242 is channeled to a fuel nozzle assembly (not shown), mixed with fuel (not shown), and burned within each combustor 224 to generate combustion gases 244 that are channeled downstream towards the turbine section 212. The combustion gases 244 generated within the combustors 224 are channeled downstream towards the turbine section 212. After impinging the turbine blade assembly 234, thermal energy is converted to mechanical rotational energy that is used to the drive rotor assembly 220. The turbine section 212 drives the compressor section 204 and/or the load 226 via the drive shaft 222, and exhaust gases 246 are discharged through the exhaust section 218 to ambient atmosphere. The one or more bearing systems 250 facilitate rotation of the rotor assembly 220 and dampen vibrational energy imparted to the one or more bearing systems 250 during operation of the turbomachine 200. Although the one or more bearing systems 250 are described and illustrated as being located within the compressor casing 206 and the turbine casing 214, the one or more bearing systems 250 may be located at any desired location along the shaft 222 including, but not limited to, a central or mid-span region of the shaft 222, or other locations along the shaft 222 where the use of conventional bearing systems would present significant design challenges.

Figure 3:
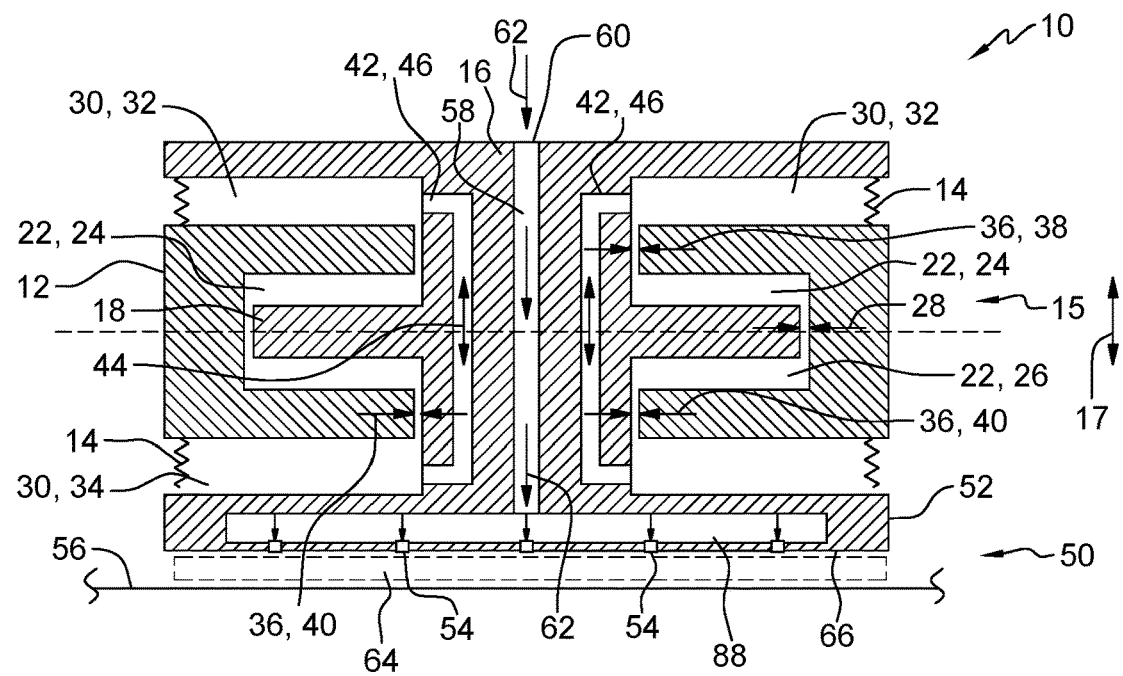
FIG. 3 is a schematic cross-section of a gas bearing system, including a frequency independent HSFD assembly and bearing pad assembly, in accordance with one or more embodiments of the present disclosure.
Figure 4:
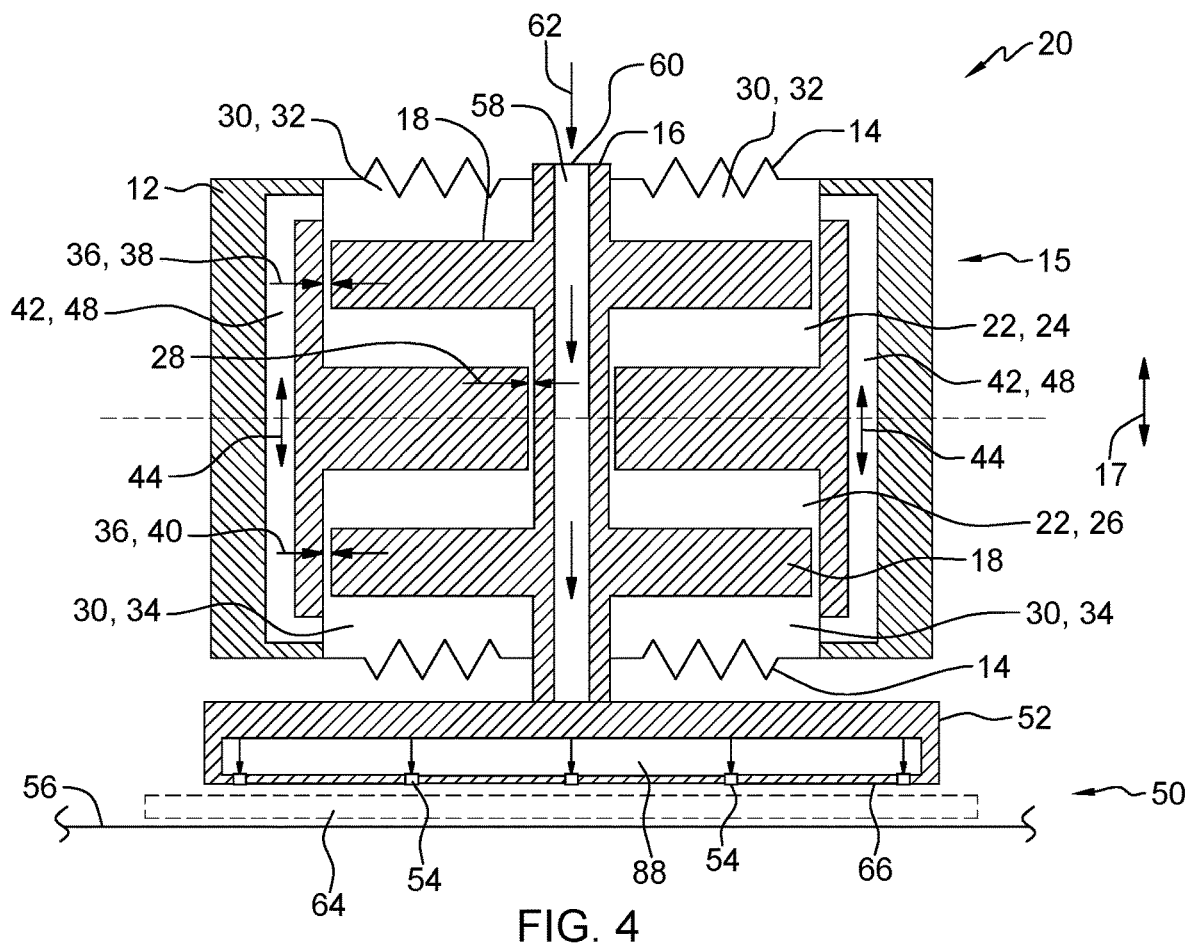
FIG. 4 is a schematic cross-section of another embodiment of a gas bearing system, including a frequency independent HSFD assembly and bearing pad assembly, in accordance with one or more embodiments of the present disclosure.

Referring now to FIGS. 3 and 4, illustrated in schematic axial cross-sectional views, are embodiments of a portion of a bearing system, generally similar to the one or more bearing systems 250 of FIG. 2, and more particularly, a frequency independent damper assembly and bearing pad assembly, referenced 10 and 20, respectively. It should be noted that components in FIGS. 3 and 4 that are identical are identified using the same reference numerals.

Each of the bearing systems 10, 20, includes a damper assembly 15 housed within a stationary annular damper housing 12 and a bearing pad assembly (described presently). The stationary annular damper housing 12 provides support to a plurality of flexible elements 14, also referred to as a support spring, and is the structure that reacts to damping and stiffness forces generated in the damper support, and more particularly, the stationary damper housing 12. As illustrated in FIG. 3, the flexible elements 14 may be disposed substantially parallel to a central post 16. As illustrated in FIG. 4, the flexible elements may be disposed substantially perpendicular to the central post 16. The moving central post 16 transmits an externally imposed vibration to a damper plunger 18, which then modulates a plurality of cavity volumes (described presently) within the bearing system 10, 20. As illustrated in FIGS. 3 and 4, varying plunger designs may be utilized in the damper assembly.

The bearing system 10, 20 includes two opposing primary damper cavities 22, and more particularly, a first primary damper cavity 24, and a second primary damper cavity 26. The first primary damper cavity 24, and the second primary damper cavity 26 are in fluid communication via a primary damper cavity clearance 28. As the primary damper cavity volumes 22 are modulated through vibratory motion transferred from the central post 16, as best illustrated by directional arrow 17, fluid flow is created and forced through the primary damper cavity clearance 28 generating viscous energy dissipation; the mechanism responsible for damping.

In contrast to known damper assemblies, to ensure that the bearing system 10, 20 generates frequency independent stiffness and damping coefficients, the flexible elements 14 are located radially outward of the primary damper cavities 22 where there are high dynamic pressures generated. The flexible elements 14 contain the hermetic damper fluid while allowing motion of the central post 16 and the damper plunger 18. The flexible elements 14 define a plurality of accumulator volumes 30, and more particularly, a first accumulator volume or cavity 32 and a second accumulator volume or cavity 34. The first accumulator cavity 32 and the second accumulator cavity 34 are thus defined radially outward the primary damper cavities 22 and fluidically decoupled from the primary damper cavities 22 through a plurality of restrictive clearances 36, and more particularly, via a first accumulator restrictive clearance 38 and a second accumulator restrictive clearance 40.

The bearing systems 10, 20 further include at least one non-restrictive pass-through channel 42 to provide for a reciprocating flow, as indicated by directional arrow 44, between the first accumulator cavity 32 and the second accumulator cavity 34. In the bearing system 10 of FIG. 3, the at least one non-restrictive pass-through channel 42 is configured as a plurality of pass through channels 46 disposed circumferentially within the central post 16 and about a gas/fluid delivery channel (described presently). In the bearing system 20 of FIG. 4, the at least one non-restrictive pass-through channel 42 is configured as a plurality of pass through channels 48 disposed circumferentially about an outer diameter of the frequency independent damper assembly 15 and not within the central post 16.

The bearing system 10, 20 further includes a bearing pad assembly 50, including a bearing pad 52 having a plurality of bearing pad orifices 54 formed therein. The bearing pad assembly 50 is disposed proximate a rotor surface 56. The central post 16 has formed therein a gas/fluid delivery channel 58 that is fluidically coupled to a gas/fluid delivery port 60 and the plurality of bearing pad orifices 54. During operation, a pressurized gas or fluid 62 is delivered via the gas/fluid delivery port 60, flows through the gas/fluid delivery channel 58 and exits the plurality of bearing pad orifices 54 to form a bearing fluid film 64 between a bearing pad surface 66 and the rotor surface 56.

As illustrated in FIG. 3, in the bearing system 10, the gas/fluid delivery channel 58 and the gas/fluid delivery port 60 are formed within the central post 16 in conjunction with the non-restrictive pass-through channel 42. As illustrated in FIG. 4, in the bearing system 20, the gas/fluid delivery channel 58 and the gas/fluid delivery port 60 are formed within the central post 16 and the non-restrictive pass-through channel 42 is formed about an outer diameter of the bearing system 20, as previously described.

Figure 5:
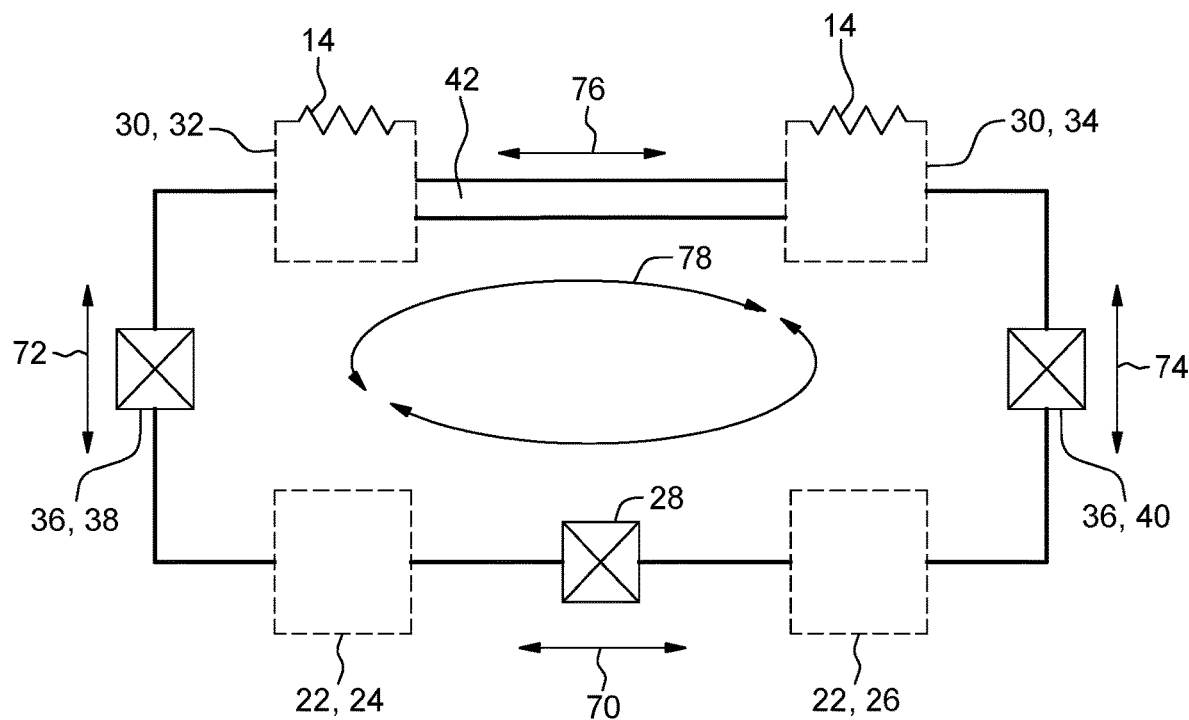
FIG. 5 is a schematic flow diagram of the frequency independent HSFD assembly of FIGS. 3 and 4, in accordance with one or more embodiments of the present disclosure.

Referring now to FIG. 5, illustrated is a high-level flow diagram, illustrating how the basic components of the bearing system, such as the bearing system 10, 20 described in FIGS. 3 and 4, and more particularly the damper assembly 15, are linked from a fluid flow perspective. In FIG. 5, the two primary damper cavities 22, and more particularly the first primary damper cavity 24 and the second primary damper cavity 26, are illustrated by dotted line. The dotted lines throughout FIG. 5, represent rigid (non-flexible) but movable boundaries. The two primary damper cavities 22 are fluidically coupled to each other through the primary damper cavity clearance 28, that provides for a restricted flow 70 between the first primary damper cavity 24 and the second primary damper cavity 26. The two accumulator cavity volumes 30, and more particularly, the first accumulator cavity 32 and the second accumulator cavity 34, are bounded by a combination of rigid (dotted line) elements and flexible (solid zig-zag lines) elements, such as flexible elements 14 of FIGS. 3 and 4. The accumulator volumes 30 are separated from the primary damper cavity volumes 22 through another set of restrictive clearances 36. More particularly, the first accumulator cavity 32 is fluidically decoupled from the first primary damper cavity 24 via the first accumulator restrictive clearance 38, that provides for a restricted flow 72. The second accumulator cavity 34 is fluidically decoupled from the second primary damper cavity 26 via the second accumulator restrictive clearance 40, that provides for a restricted flow 74. The two accumulator cavity volumes 30, and more particularly, the first accumulator cavity 32 and the second accumulator cavity 34, are fluidically coupled through the non-restrictive pass-through channel 42, that provides for a flow 76. In combination, the elements of the bearing system 10, 20 generate an oscillating-recirculating flow 78 when external vibratory motion, as described with reference to FIGS. 3 and 4, is imposed on the system.

Figure 6:
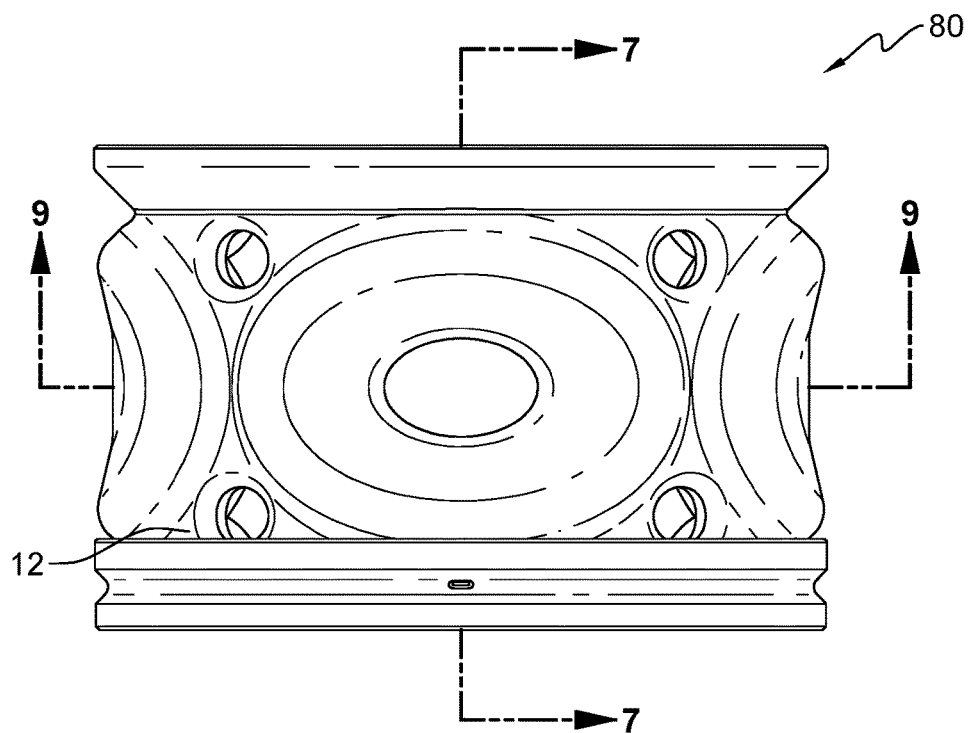
FIG. 6 is a schematic exterior view of an embodiment of an additively manufactured gas bearing system, in accordance with one or more embodiments of the present disclosure.
Figure 7:
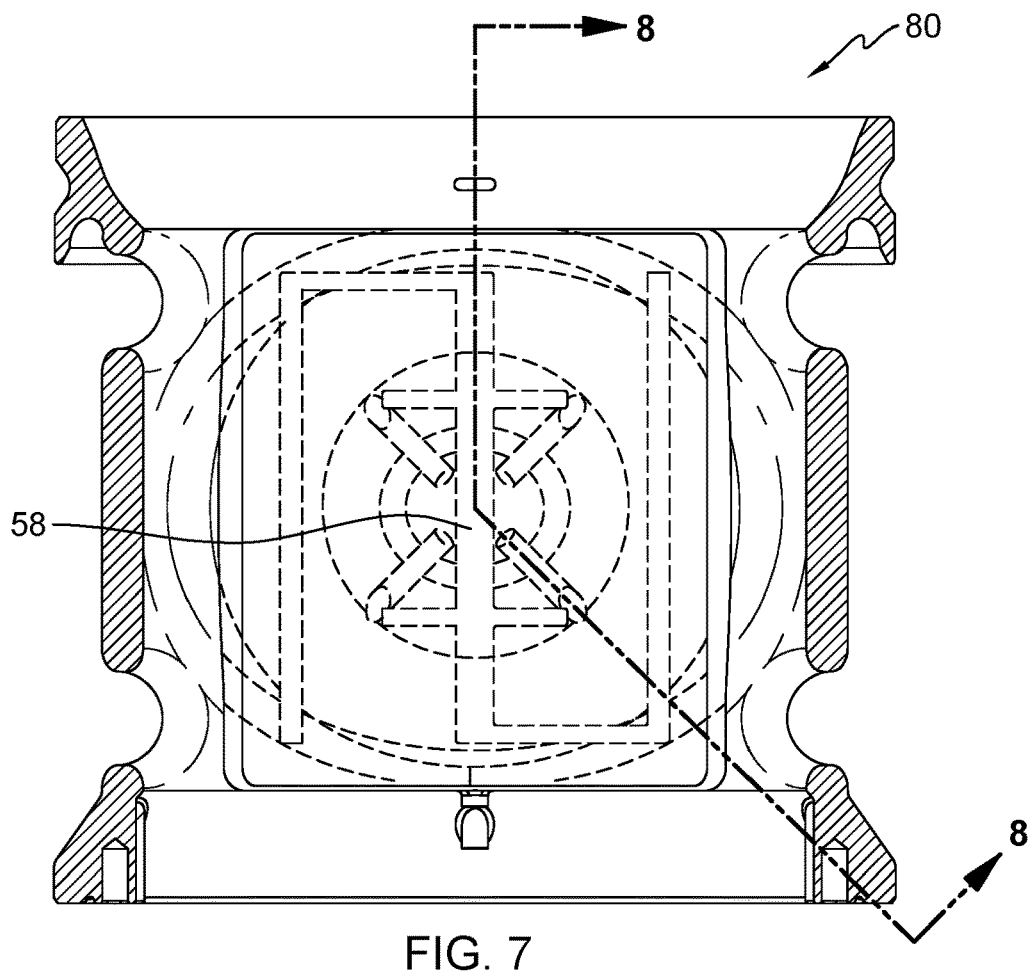
FIG. 7 is a schematic cross-sectional view of the additively manufactured gas bearing system of FIG. 6, taken through line 7-7 of FIG. 6, in accordance with one or more embodiments of the present disclosure.
Figure 8:
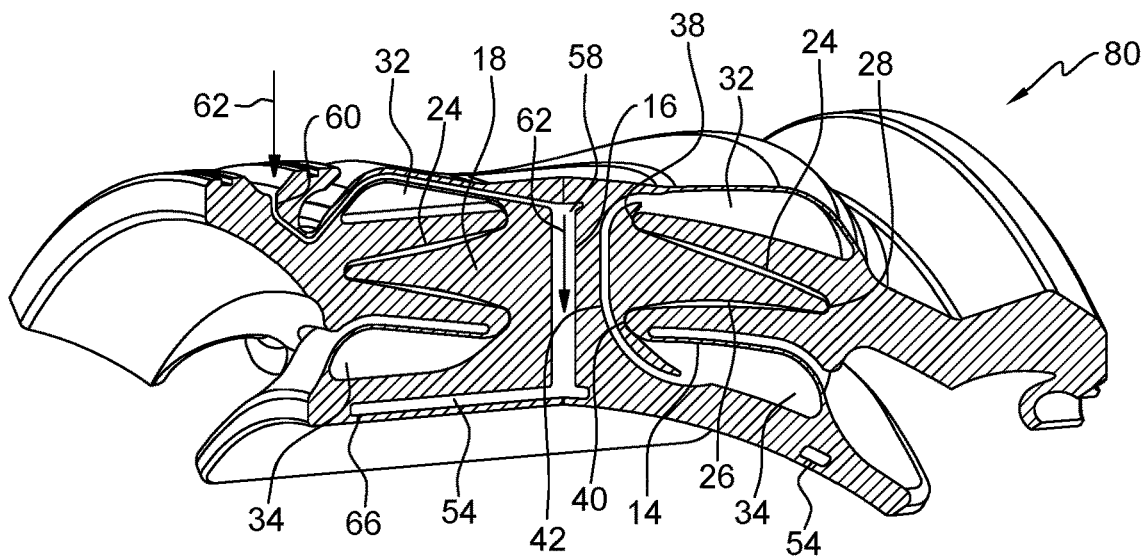
FIG. 8 is a schematic partial 45° cross-sectional view of the additively manufactured gas bearing system of FIG. 6, taken through line 8-8 of FIG. 7, in accordance with one or more embodiments of the present disclosure.
Figure 9:
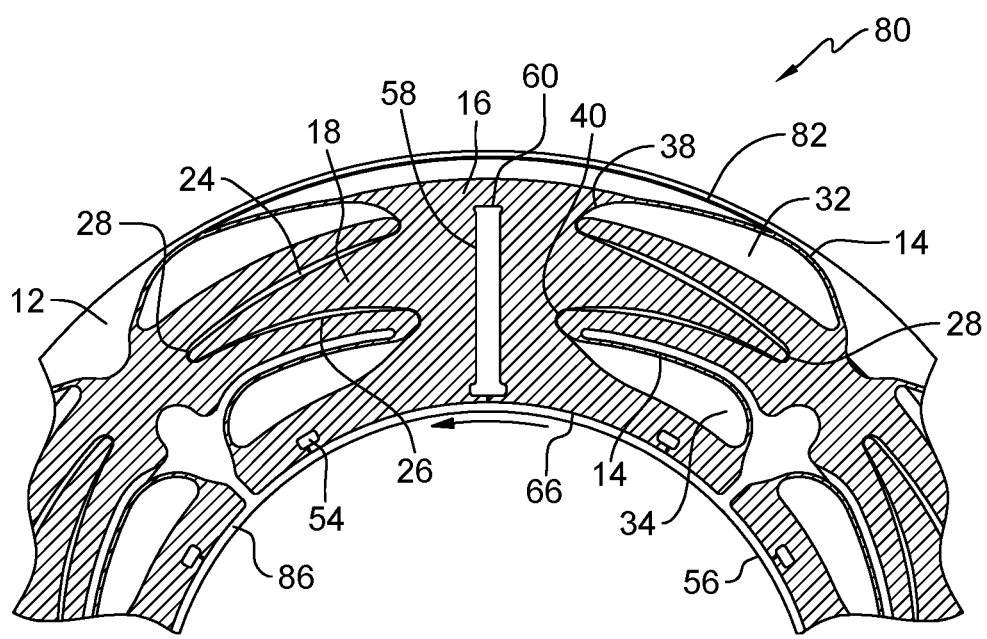
FIG. 9 is a cross-sectional view of the additively manufactured gas bearing system of FIG. 6, taken along line 9-9 of FIG. 6, in accordance with one or more embodiments of the present disclosure.
Figure 10:
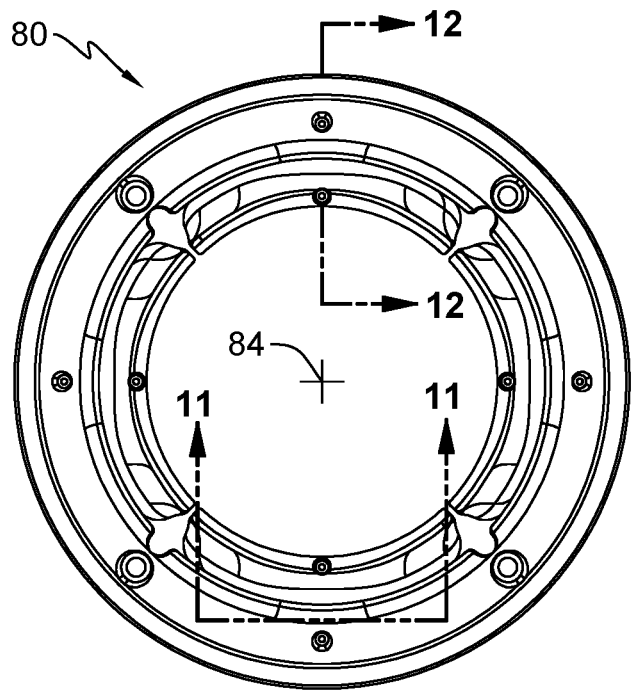
FIG. 10 is a schematic end view of the additively manufactured gas bearing system of FIG. 6, in accordance with one or more embodiments of the present disclosure.
Figure 11:
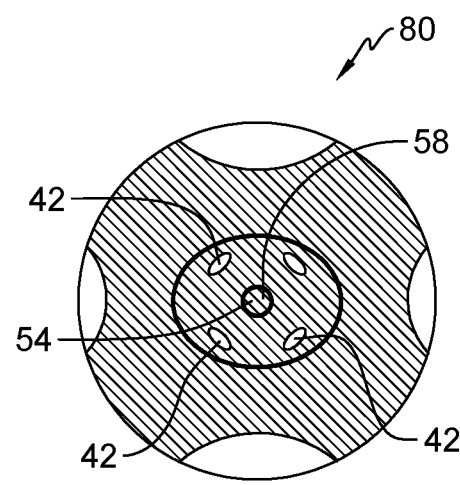
FIG. 11 is a cross-sectional view of the additively manufactured gas bearing system of FIG. 6, taken along line 11-11 of FIG. 10, in accordance with one or more embodiments of the present disclosure.

Referring now to FIGS. 6-12, illustrated is a schematic exterior view (FIG. 6), a cross-sectional view (FIG. 7) taken through line 7-7 of FIG. 6, a partial 45° cross-sectional view (FIG. 8) taken through line 8-8 of FIG. 7, a cross-sectional view (FIG. 9) taken through line 9-9 of FIG. 6, a schematic end view (FIG. 10), a partial cross-sectional view (FIG. 11) taken through line 11-11 of FIG. 10 and a cross-sectional view (FIG. 12) taken through line 12-12 of FIG. 10, of an exemplary bearing system 80, generally similar to the bearing system 10 of FIG. 3, in accordance with one or more embodiments of the present disclosure. In this particular embodiment, the frequency independent bearing system 80 is fabricated using additive manufacturing techniques, resulting in a single integral design. It should be noted that components in FIGS. 6-12 that are identical to those previously described in FIG. 3, are identified using the same reference numerals.

In the illustrated embodiment of FIGS. 6-12, the bearing system may generally comprise a stationary damper housing 12. The stationary damper housing 12 provides support to the damper assembly 15, and in particular, the plurality of flexible elements 14, and the bearing pad assembly 50. The moving central post 16 of the damper assembly 15 transmits an externally imposed vibration to a damper plunger 18, which then modulates a plurality of cavity volumes (described presently) within the bearing system 80.

The frequency independent damper assembly 15 includes a first primary damper cavity 24, and a second primary damper cavity 26 in fluid communication via a primary damper cavity clearance 28. As the primary damper cavity volumes 24, 26 are modulated through vibratory motion transferred from the central post 16, fluid flow is created and forced through the primary damper cavity clearance 28 generating viscous energy dissipation, and more specifically, damping.

As previously described, to ensure that the bearing system 80, and more particularly the damper assembly 15, generates frequency, independent stiffness and damping coefficients, the flexible elements 14 are located radially outward of the first and second primary damper cavities 24, 26 where there are high dynamic pressures generated. The flexible elements 14 define a first accumulator cavity 32 and a second accumulator cavity 34. The first accumulator cavity 32 and the second accumulator cavity 34 are fluidically decoupled from the first and second primary damper cavities 24, 26 via a first accumulator restrictive clearance 38 and a second accumulator restrictive clearance 40, respectively.

The frequency independent damper assembly 15 further includes a plurality of non-restrictive pass-through channels 42 to provide for a reciprocating flow between the first accumulator cavity 32 and the second accumulator cavity 34. The plurality of non-restrictive pass-through channels 42 are configured circumferentially spaced about a diameter of the frequency independent damper assembly 15.

Figure 12:
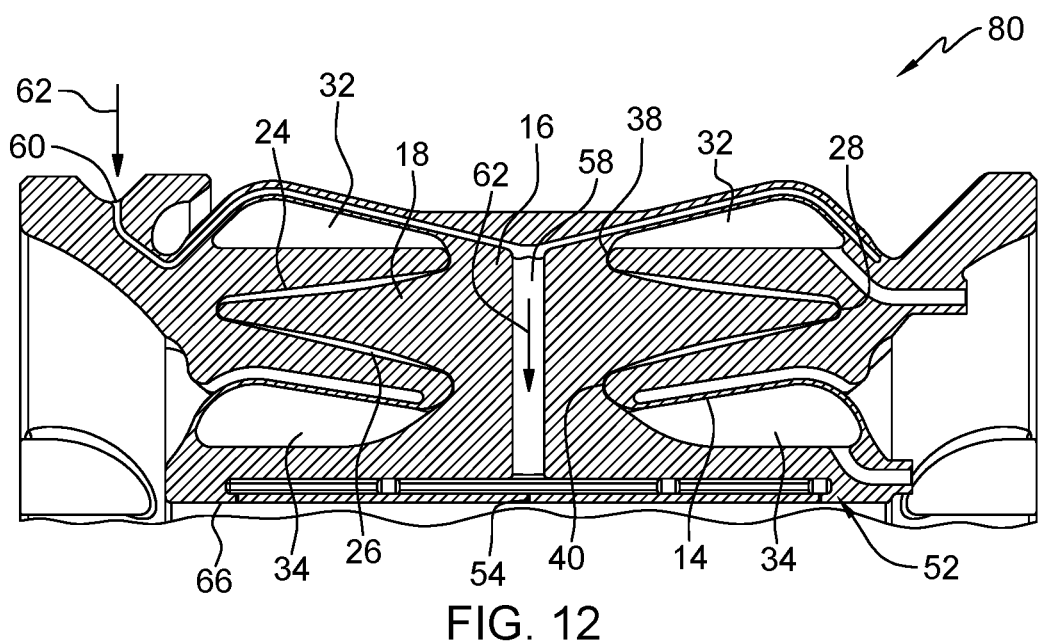
FIG. 12 is a cross-sectional view of the additively manufactured gas bearing system of FIG. 6, taken along line 12-12 of FIG. 10, in accordance with one or more embodiments of the present disclosure.

Referring more specifically to FIGS. 8, 9 and 12, illustrated are cross-sectional views of the exemplary gas bearing system 80. In some embodiments, the gas bearing system 80 may generally comprise an outer rim 82, the housing 12, a plurality of bearing pads 52 (of which only a single bearing pad is illustrated, FIG. 12) and the plurality of frequency independent damper assemblies 15, in accordance with embodiments disclosed herein.

The bearing pads 52 are symmetrically arranged about a central axis 84 of the damper assembly 15 and define an annular inner bearing pad surface 66 that is configured to support a rotatable shaft (e.g. shaft 222 of FIG. 2). Each bearing pad 52 is adapted to receive a working gas or fluid 62 (e.g., air, compressed air and combustion gases, or the like) via a gas/fluid delivery port 60 and a gas/fluid delivery channel 58 and disperse the gas or fluid 62 to support, by way of a bearing pad fluid film 64 and/or lubricate the shaft during operation of the turbomachine, thereby providing a hydrostatically pressurized compliant bearing pad 52. For example, in some embodiments, each bearing pad 52 may include a plurality of bearing pad orifices 54 disposed across the bearing pad 52 to provide an evenly distributed fluid film 64 within an interior cavity 86 defined between the bearing pad surface 66 and the rotor surface 56 for supporting and/or lubricating the shaft. Alternatively, or in combination, in some embodiments each bearing pad 52 has a sufficiently high gas permeability to permit the gas or fluid 62 received via the gas/fluid delivery port 60 and the gas/fluid delivery channel 58 to generate sufficient pressure within the interior cavity 86 to provide the support and/or lubrication of the rotor. The plurality of bearing pad orifices 54 may be fluidly coupled to one or more plenums 88 (FIGS. 3 and 4) to facilitate even distribution of the gas or 62.

The plurality of bearing pad orifices 54 may be configured having any dimensions or arrangements (e.g., array, pattern or configuration) suitable to function as described herein. For example, in some embodiments, the plurality of bearing pad orifices 54 may generally have a diameter in the range of between about 2 mils (about 50 micrometers) and about 100 mils (about 2,540 micrometers) and, more specifically, between about 5 mils (about 127 micrometers) and about 20 mils (about 508 micrometers).

The bearing pads 52 may be fabricated from any material suitable to withstand the working conditions of the bearing system 80. In addition, in some embodiments, the bearing pad 52 is fabricated form a material having a sufficiently low porosity to prevent instabilities in the thin gas film, and more particularly the bearing fluid film 64, created between the bearing pads 52 and the rotor/shaft during operation of the turbomachine. For example, in some embodiments, the bearing pads 52 may be fabricated from porous carbons, such as carbon graphite, sintered porous ceramics, and sintered porous metals, such as Inconel® and stainless steel.

It has been observed that the disclosed bearing system including the disclosed damper assembly and bearing pad assembly, may further allow the bearing to be utilized in unconventional locations and/or integrations throughout a turbomachine without disrupting an existing cross section, length or architecture of the turbomachine. Such utilization of the inventive bearing may advantageously benefit engine operation due to reduced clearance closures during maneuver of loads, ability to engineer loner rotor bearing systems with additional stages, reduction in dynamic bearing and structural loads, reduction in synchronous vibration response, and improved stability.

Figure 13:
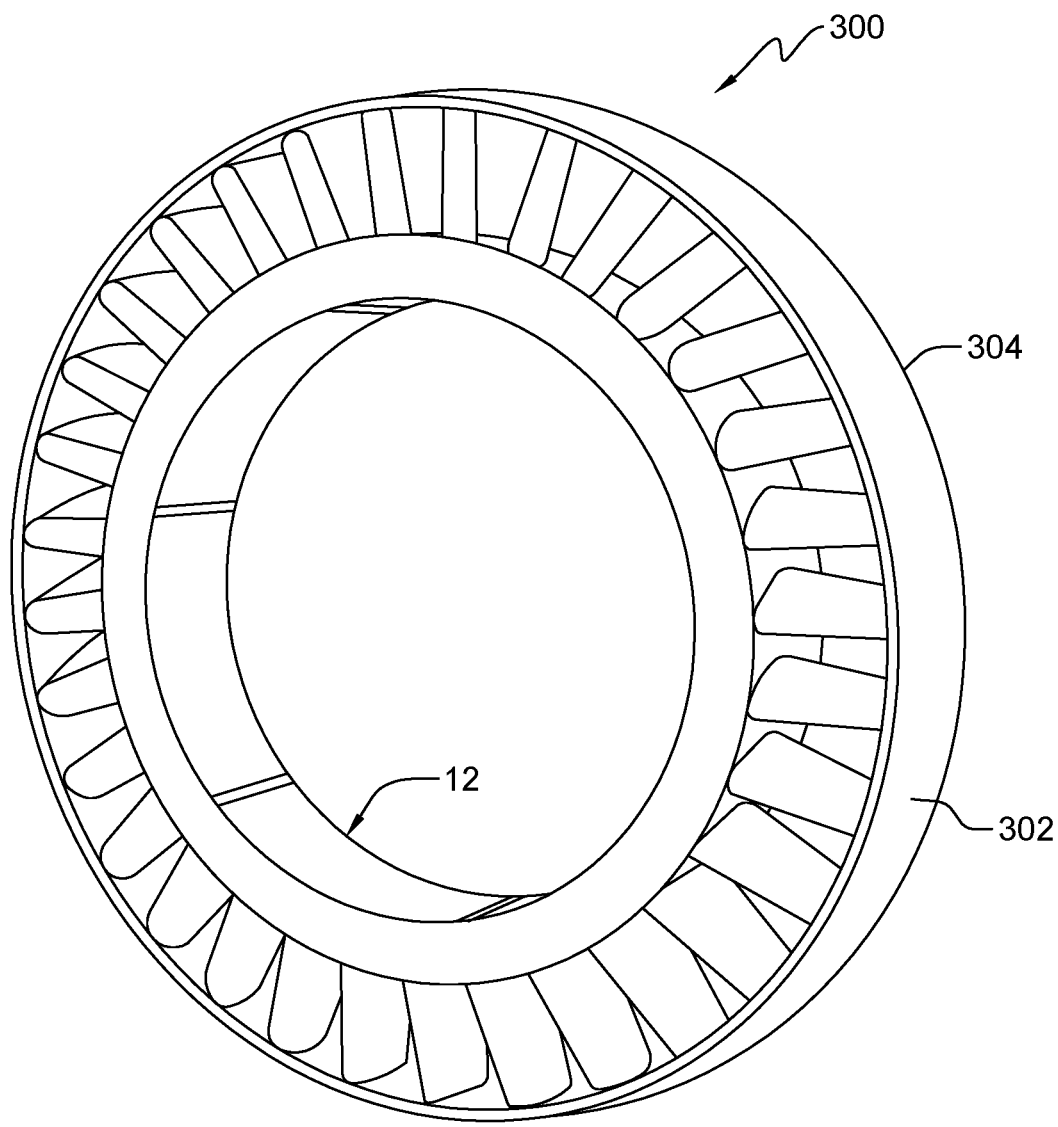
FIG. 13 is a simplified turbine nozzle including an exemplary gas bearing system, in accordance with one or more embodiments of the present disclosure.

For example, in some embodiments, the bearing system may be integrated into a turbine nozzle 300 of an aircraft engine, such as shown in FIG. 13. In such embodiments, a plurality of guide vanes 302 of the nozzle 300 may be disposed between, and supported by, the housing 12 (FIGS. 6-12) of the bearing and an outer ring 304 of the turbine nozzle 300.

Thus, embodiments of a bearing system including a damper assembly and a bearing pad assembly are disclosed. The damper assembly includes a bearing support employing first and second accumulator volumes defined by flexible elements that are disposed radially outward of a primary damper cavity, and wherein the first and second accumulator volumes are connected with a pass-through channel. The bearing pad assembly is integrated with the damper housing and is fluidically coupled to a flow channel formed in the central post. By using an active control in the primary damper cavity to adjust a dynamic volume change, damping and stiffness coefficients are frequency independent. The disclosed bearing design provides high speed stable operation of rotors in high performance turbomachinery. The design further provides for lubricating main shaft bearings with the process fluid which in turn simplifies design leading to cost reduction and also has performance benefits due to reduction in bearing power loss (heat generation). The novel bearing system advantageously incorporates the pass-through channels, the three critical clearances and the pressured gas delivery port/channels that feed the bearing pad, into the same bearing housing.

Ranges disclosed herein are inclusive and combinable (e.g., ranges of "about 2 mils and about 100 mils", is inclusive of the endpoints and all intermediate values of the ranges of "about 2 mils and about 100 mils," etc.). "Combination" is inclusive of blends, mixtures, alloys, reaction products, and the like. Furthermore, the terms "first," "second," and the like, herein do not denote any order, quantity, or importance, but rather are used to distinguish one element from another, and the terms "a" and "an" herein do not denote a limitation of quantity, but rather denote the presence of at least one of the referenced item. The modifier "about" used in connection with a quantity is inclusive of the state value and has the meaning dictated by context, (e.g., includes the degree of error associated with measurement of the particular quantity). The suffix "(s)" as used herein is intended to include both the singular and the plural of the term that it modifies, thereby including one or more of that term (e.g., the colorant(s) includes one or more colorants). Reference throughout the specification to "one embodiment", "some embodiments", "another embodiment", "an embodiment", and so forth, means that a particular element (e.g., feature, structure, and/or characteristic) described in connection with the embodiment is included in at least one embodiment described herein, and may or may not be present in other embodiments. In addition, it is to be understood that the described elements may be combined in any suitable manner in the various embodiments.

This written description uses examples to disclose the invention, including the best mode, and to enable any person skilled in the art to practice the invention, including making and using any devices or systems and performing any incorporated methods. While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from essential scope thereof. Therefore, it is intended that the invention not be limited to the particular embodiment disclosed as the best mode contemplated for carrying out this invention, but that the invention will include all embodiments falling within the scope of the appended claims. Such other examples are intended to be within the scope of the claims if they include structural elements that do not differ from the literal language of the claims, or if they include equivalent structural elements with insubstantial differences from the literal languages of the claims.

What is claimed is:

1. A bearing system comprising:
   a frequency independent damper assembly comprising:
      an annular damper housing;
      a damper plunger disposed at least partially within the annular damper housing, wherein the damper plunger is movable within the annular damper housing to define a first primary damper cavity and a second primary damper cavity;
      a moving central post, wherein an externally imposed vibration transmitted from the moving central post to the damper plunger modulates the first primary damper cavity and the second primary damper cavity, the moving central post having defined therein a fluid channel for the flow of a pressurized working fluid;
      a support spring including a plurality of flexible elements coupled to the annular damper housing and defining a plurality of accumulator volumes, the plurality of flexible elements disposed radially outward of the first primary damper cavity and the second primary damper cavity, wherein the plurality of accumulator volumes comprise a first accumulator cavity and a second accumulator cavity;
      at least one flow-through channel coupling the first accumulator cavity to the second accumulator cavity, and
   a bearing pad assembly in fluid communication with the frequency independent damper assembly, the bearing pad assembly comprising:
      a bearing pad having a plurality of bearing pad orifices fluidly coupled to the fluid channel in the moving central post.

2. The bearing system as claimed in claim 1, wherein the fluid channel is centrally disposed in the moving central post and a plurality of flow-through channels are disposed circumferentially within the moving central post and about the centrally disposed fluid channel.

3. The bearing system as claimed in claim 1, wherein the fluid channel is centrally disposed in the moving central post and a plurality of flow-through channels are disposed about an outer diameter of the frequency independent damper assembly and not within the moving central post.

4. The bearing system as claimed in claim 1, wherein the plurality of flexible elements are disposed substantially perpendicular to the moving central post.

5. The bearing system as claimed in claim 1, wherein the plurality of flexible elements are disposed substantially parallel to the moving central post.

6. The bearing system as claimed in claim 1, wherein the first primary damper cavity and the second primary damper cavity are in fluid communication via a primary damper cavity clearance.

7. The bearing system as claimed in claim 1, further comprising a plurality of restrictive clearances fluidically decoupling the first accumulator cavity and the second accumulator cavity from the first primary damper cavity and the second primary damper cavity.

8. The bearing system as claimed in claim 7, wherein the plurality of restrictive clearances comprise a first accumulator restrictive clearance fluidically decoupling the first primary damper cavity and the first accumulator cavity and a second accumulator restrictive clearance fluidically decoupling the second primary damper cavity and the second accumulator cavity.

9. The bearing system as claimed in claim 1, wherein the pressurized working fluid is at least one of air and $CO_2$.

10. The bearing system as claimed in claim 1, wherein the pressurized working fluid exits the plurality of bearing pad orifices to form a bearing pad fluid film between a bearing pad surface and a rotor surface.

11. A bearing system, comprising:
an outer rim;
a housing;
a frequency independent damper assembly disposed in the housing, the frequency independent damper assembly comprising:
 a damper housing;
 a damper plunger disposed at least partially within the damper housing, wherein the damper plunger is movable within the damper housing to define a first primary damper cavity and a second primary damper cavity;
 a moving central post, wherein an externally imposed vibration transmitted from the moving central post to the damper plunger modulates the first primary damper cavity and the second primary damper cavity, the moving central post having defined therein a fluid channel for the flow of a pressurized working fluid;
 a support spring including a plurality of flexible elements coupled to the damper housing and defining a plurality of accumulator volumes, the plurality of flexible elements disposed radially outward of the first primary damper cavity and the second primary damper cavity, wherein the plurality of accumulator volumes comprise a first accumulator cavity and a second accumulator cavity; and
 a plurality of non-restrictive flow-through channels coupling the first accumulator cavity to the second accumulator cavity, and
a bearing pad assembly in fluid communication with the frequency independent damper assembly, the bearing pad assembly comprising:
 a bearing pad including a plurality of bearing pad orifices coupled to the fluid channel in the moving central post.

12. The bearing system as claimed in claim 11, wherein the plurality of non-restrictive flow-through channels are defined circumferentially within the moving central post about a centrally disposed fluid channel.

13. The bearing system as claimed in claim 11, wherein the plurality of non-restrictive flow-through channels are disposed circumferentially about an outer diameter of the frequency independent damper assembly and not within the moving central post.

14. The bearing system as claimed in claim 11, wherein the plurality of flexible elements are disposed one of substantially perpendicular to the moving central post or substantially parallel to the moving central post.

15. The bearing system as claimed in claim 11, wherein the first primary damper cavity and the second primary damper cavity are in fluid communication via a primary damper cavity clearance.

16. The bearing system as claimed in claim 11, further comprising a plurality of restrictive clearances fluidically decoupling the first accumulator cavity and the second accumulator cavity from the first primary damper cavity and the second primary damper cavity.

17. The bearing system as claimed in claim 16, wherein the plurality of restrictive clearances comprise a first accumulator restrictive clearance fluidically decoupling the first accumulator cavity and the first primary damper cavity and a second accumulator restrictive clearance fluidically decoupling the second accumulator cavity and the second primary damper cavity.

18. A bearing system, comprising:
an outer rim;
a housing; and
a frequency independent damper assembly disposed in the housing, the frequency independent damper assembly comprising:
 a damper housing;
 a damper plunger disposed at least partially within the housing, wherein the damper plunger is movable within the housing to define a first primary damper cavity and a second primary damper cavity, wherein the first primary damper cavity and the second primary damper cavity are in fluid communication via a primary damper cavity clearance;
 a moving central post, wherein an externally imposed vibration transmitted from the moving central post to the damper plunger modulates the first primary damper cavity and the second primary damper cavity, the moving central post having defined therein a fluid channel for the flow of a pressurized working fluid;
 a support spring including a plurality of flexible elements coupled to the damper housing and defining a plurality of accumulator volumes, the plurality of flexible elements disposed radially outward of the first primary damper cavity and the second primary damper cavity, wherein the plurality of accumulator volumes comprise a first accumulator cavity and a second accumulator cavity;
 at least one non-restrictive flow-through channel coupling the first accumulator cavity to the second accumulator cavity;
 a plurality of restrictive clearances fluidically decoupling the first accumulator cavity and the second accumulator cavity from the first primary damper cavity and the second primary damper cavity, and
a bearing pad assembly in fluid communication with the frequency independent damper assembly, the bearing pad assembly disposed in the housing and comprising:

a bearing pad coupled to the damper housing, the bearing pad including a plurality of bearing pad orifices coupled to the fluid channel in the moving central post.

19. The bearing system as claimed in claim 18, wherein the at least one non-restrictive flow-through channel comprises a plurality of non-restrictive flow-through channels defined circumferentially within the moving central post about a centrally disposed fluid channel.

20. The bearing system as claimed in claim 18, wherein the at least one non-restrictive flow-through channel comprises a plurality of non-restrictive flow-through channels disposed circumferentially about an outer diameter of the frequency independent damper assembly and not within the moving central post.

* * * * *